United States Patent
Suzuki et al.

(10) Patent No.: US 10,821,999 B2
(45) Date of Patent: Nov. 3, 2020

(54) VEHICLE CONTROL APPARATUS

(71) Applicant: SUBARU CORPORATION, Tokyo (JP)

(72) Inventors: Hiroyuki Suzuki, Tokyo (JP); Yukihiko Murakami, Tokyo (JP); Koh Inamura, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 117 days.

(21) Appl. No.: 15/842,491

(22) Filed: Dec. 14, 2017

(65) Prior Publication Data
US 2018/0265097 A1    Sep. 20, 2018

(30) Foreign Application Priority Data

Mar. 16, 2017    (JP) .................................. 2017-051307

(51) Int. Cl.
| | |
|---|---|
| *B60T 8/17* | (2006.01) |
| *B60T 8/1755* | (2006.01) |
| *B62D 15/00* | (2006.01) |
| *B62D 15/02* | (2006.01) |
| *B60L 15/20* | (2006.01) |
| *B60W 10/119* | (2012.01) |
| *B60W 30/09* | (2012.01) |
| *B60W 30/12* | (2020.01) |
| *B60W 50/14* | (2020.01) |
| *G08G 1/16* | (2006.01) |

(Continued)

(52) U.S. Cl.
CPC .......... *B60W 50/16* (2013.01); *B60W 10/119* (2013.01); *B60W 30/12* (2013.01); *B60W 30/18163* (2013.01); *B60W 2710/08* (2013.01); *B60W 2710/083* (2013.01); *Y02T 10/7275* (2013.01)

(58) Field of Classification Search
None
See application file for complete search history.

(56) References Cited

U.S. PATENT DOCUMENTS

2004/0010371 A1* 1/2004 Matsumoto ......... B60T 8/17557
701/300
2004/0252020 A1* 12/2004 Matsumoto ........... B60W 50/16
340/438

(Continued)

FOREIGN PATENT DOCUMENTS

| JP | 2004-352052 A | 12/2004 |
|---|---|---|
| JP | 2005-157754 A | 6/2005 |

(Continued)

OTHER PUBLICATIONS

Japanese Office Action issued in corresponding Japanese Patent Application No. 2017-051307, dated Aug. 14, 2018, with English Translation.

*Primary Examiner* — Adam D Tissot
*Assistant Examiner* — Laura E Linhardt
(74) *Attorney, Agent, or Firm* — McDermott Will & Emery LLP

(57) ABSTRACT

A vehicle control apparatus includes a deviation detector and a motor controller. The deviation detector is configured to detect a deviation of a host vehicle from a travel lane. Upon the deviation detector detecting the deviation, the motor controller is configured to increase and decrease torque of a driving motor that transfers a driving force to a wheel.

5 Claims, 5 Drawing Sheets

(51) Int. Cl.
*B60W 50/16* (2020.01)
*B60W 30/18* (2012.01)

(56) References Cited

U.S. PATENT DOCUMENTS

| | | | | |
|---|---|---|---|---|
| 2005/0107931 | A1* | 5/2005 | Shimakage | G08G 1/167 |
| | | | | 701/41 |
| 2005/0236210 | A1* | 10/2005 | Kawazoe | B62D 15/029 |
| | | | | 180/272 |
| 2011/0231095 | A1* | 9/2011 | Nakada | B60W 30/12 |
| | | | | 701/301 |
| 2012/0293313 | A1* | 11/2012 | Yu | B60Q 9/008 |
| | | | | 340/435 |
| 2015/0039186 | A1* | 2/2015 | Okuda | G08G 1/167 |
| | | | | 701/41 |
| 2017/0136842 | A1* | 5/2017 | Anderson | B60G 17/0195 |
| 2017/0166254 | A1* | 6/2017 | Katoh | B62D 6/005 |
| 2018/0201318 | A1* | 7/2018 | Kataoka | B62D 15/025 |

FOREIGN PATENT DOCUMENTS

| | | |
|---|---|---|
| JP | 2005-193774 A | 7/2005 |
| JP | 2009-098731 A | 5/2009 |

* cited by examiner

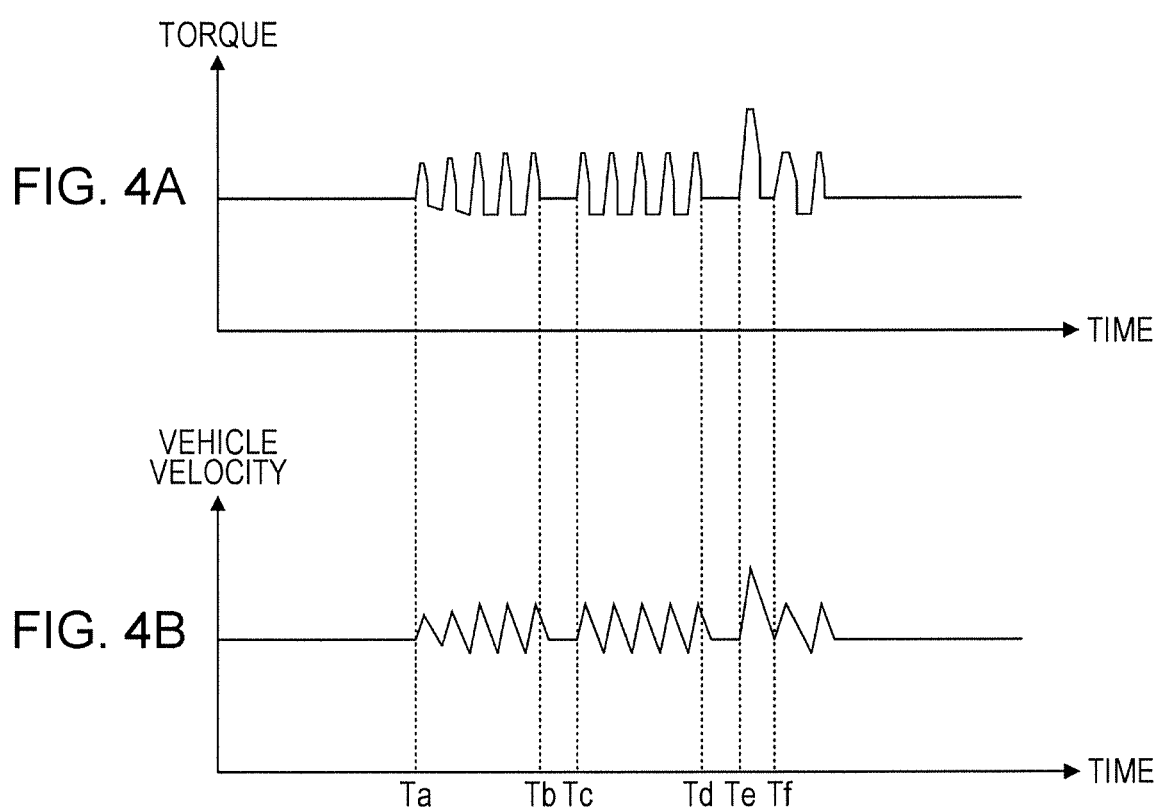

VEHICLE CONTROL APPARATUS

CROSS-REFERENCE TO RELATED APPLICATIONS

The present application claims priority from Japanese Patent Application No. 2017-051307 filed on Mar. 16, 2017, the entire contents of which are hereby incorporated by reference.

BACKGROUND

1. Technical Field

The present invention relates to a vehicle control apparatus that controls the torque of a drive motor.

2. Related Art

Roads on which vehicles travel are provided with projections such as rumble strips and chatter bars in order to inform a driver that their vehicle deviates from a travel lane. Japanese Unexamined Patent Application Publication (JP-A) No. 2004-352052 discloses a technique that, upon it is determined that the host vehicle deviates from the travel lane, generates a vibration by varying a braking force of the host vehicle as if the host vehicle is running on such projections. In addition, Japanese Unexamined Patent Application Publication (JP-A) No. 2009-98731 discloses a technique that provides a dedicated motor on a driver's seat and generates a vibration on the driver's seat by using the dedicated motor.

According to the techniques in JP-A No. 2004-352052 and JP-A No. 2009-98731, it is possible to inform a driver, by using the vibration, that the host vehicle deviates from the travel lane. However, the technique in JP-A No. 2004-352052 loses the kinetic energy of the host vehicle due to the braking force. In addition, the technique in JP-A No. 2009-98731 consumes electrical energy of a battery in order to drive the dedicated motor.

SUMMARY OF THE INVENTION

It is desirable to provide a vehicle control apparatus that can inform a driver that a host vehicle deviates from a travel lane with the energy consumption reduced.

An aspect of the present invention provides a vehicle control apparatus including a deviation detector and a motor controller. The deviation detector is configured to detect a deviation of a host vehicle from a travel lane. Upon the deviation detector detecting the deviation, the motor controller is configured to increase and decrease torque of a driving motor that transfers a driving force to a wheel.

BRIEF DESCRIPTION OF THE DRAWINGS

FIG. 4A illustrates exemplary torque of motor generators,
and FIG. 4B illustrates exemplary vehicle velocity.

DETAILED DESCRIPTION

Figure 1:
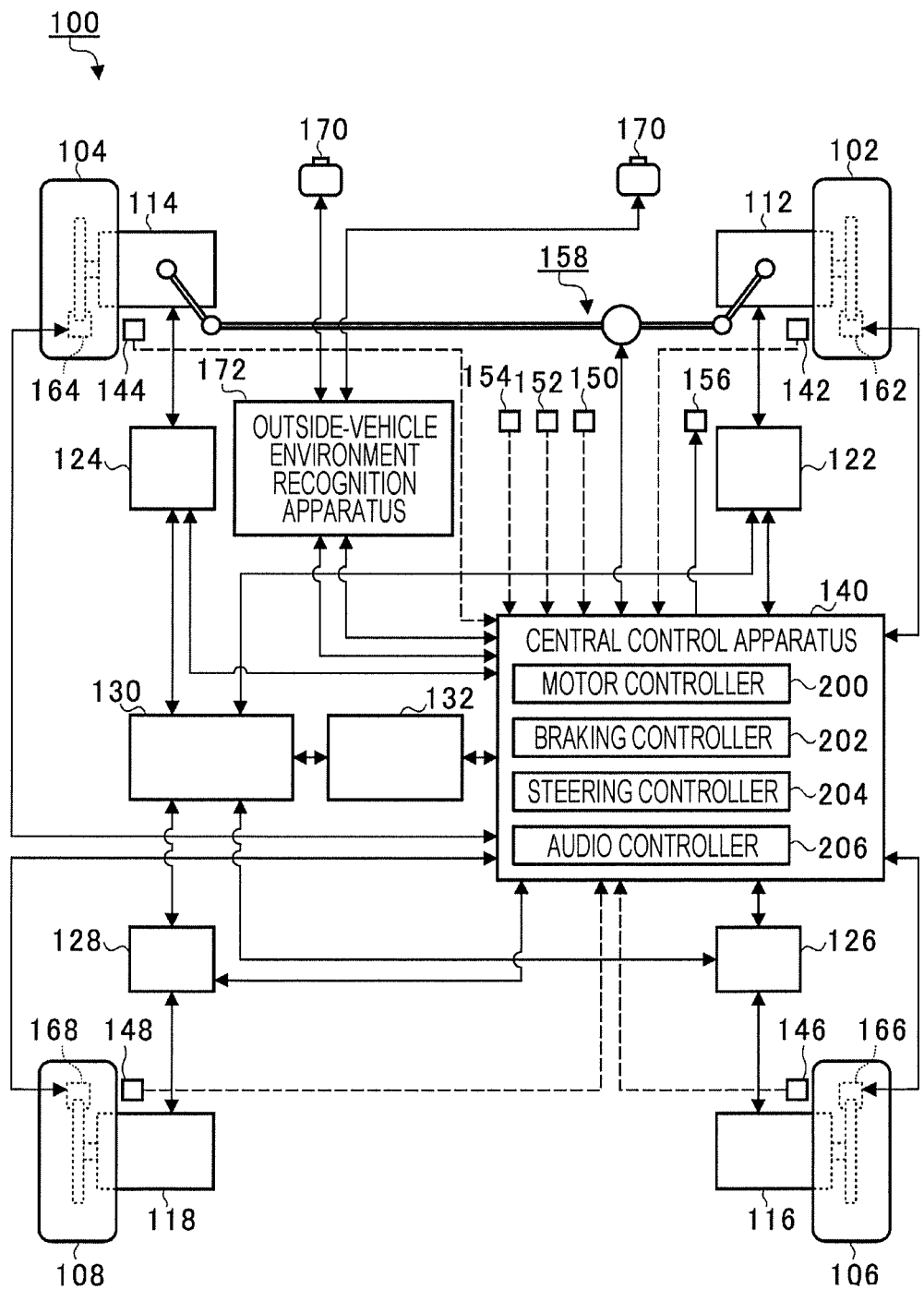
FIG. 1 illustrates a configuration of an electric vehicle.

Now, an example of the present invention will be described below in detail with reference to the attached drawings. The scale, materials, specific numeric values, and the like described in the example are merely exemplary ones for ease of understanding of the present invention and do not limit the present invention unless otherwise stated. Note that elements having substantially the same function and configuration are denoted by the same reference numerals to omit a repeated description in the specification and the drawings. In addition, elements that are not directly relevant to the present invention are omitted from illustration.

FIG. 1 illustrates a configuration of an electric vehicle 100. As illustrated in FIG. 1, in the electric vehicle 100, a right front wheel (wheel) 102, a left front wheel (wheel) 104, a right rear wheel (wheel) 106, and a left rear wheel (wheel) 108 are respectively connected to motor generators (drive motors) 112, 114, 116, and 118. The motor generators 112, 114, 116, and 118 are connected to a battery 130 via inverters 122, 124, 126, and 128, respectively, are rotated by electric power supplied from the battery 130, and transfer driving forces to the right front wheel 102, the left front wheel 104, the right rear wheel 106, and the left rear wheel 108, respectively. The motor generators 112, 114, 116, and 118 also output generated electric power to the battery 130. The electric vehicle 100 causes the motor generators 112, 114, 116, and 118 to be independently driven (rotated), and thereby the right front wheel 102, the left front wheel 104, the right rear wheel 106, and the left rear wheel 108 are independently driven.

The battery 130 is connected to a battery controller 132 and is controlled by the battery controller 132. The battery controller 132 is connected to a central control apparatus 140, monitors the charging and discharging current amount of the battery 130, the temperature of the battery 130, and the like, calculates the remaining capacity of the battery 130 on the basis of the charging and discharging current amount, and outputs such data about the battery 130 to the central control apparatus 140 as necessary.

The central control apparatus 140 is configured by a microcomputer including a central processing unit (CPU), a random access memory (RAM), and a read only memory (ROM), and generally controls each unit. The central control apparatus 140 is connected to each of rotational speed sensors 142, 144, 146, and 148, an acceleration pedal sensor 150, a brake pedal sensor 152, and a steering angle sensor 154, and receives a signal indicating a value detected by each of the sensors 142 to 154. The central control apparatus 140 is further connected to the inverters 122, 124, 126, and 128, and controls the driving of the motor generators 112, 114, 116, and 118 through the inverters 122, 124, 126, and 128 on the basis of a signal that is input from the battery controller 132 and each of the sensors 142 to 154.

The rotational speed sensors 142, 144, 146, and 148 are configured by, for example, resolvers. The rotational speed sensors 142, 144, 146, and 148 respectively detect rotational speeds of the motor generators 112, 114, 116, and 118 (the right front wheel 102, the left front wheel 104, the right rear wheel 106, and the left rear wheel 108) and output signals indicating the rotational speeds to the central control apparatus 140.

The acceleration pedal sensor 150 detects the depressed amount of the acceleration pedal and outputs a signal indicating the depressed amount to the central control apparatus 140.

The brake pedal sensor 152 detects the depression amount of the brake pedal and outputs a signal indicating the depression amount to the central control apparatus 140.

The steering angle sensor 154 detects a steering angle and outputs a signal indicating the steering angle to the central control apparatus 140.

A speaker (audio output unit) 156 is provided in, for example, a compartment, and outputs a vibration sound under control of an audio controller 206 of the central control apparatus 140, which will be described later.

A steering mechanism 158 is provided between the motor generator 112 (the right front wheel 102) and the motor generator 114 (the left front wheel 104) and changes the angles of the right front wheel 102 and the left front wheel 104 with respect to the vehicle body in accordance with the steering angle. The steering mechanism 158 includes a steering motor, which is not illustrated. During cruise control or autonomous driving, the steering motor is driven under control of a steering controller 204 of the central control apparatus 140, which will be described later, and thereby the steering mechanism 158 changes the angles of the right front wheel 102 and the left front wheel 104 with respect to the vehicle body.

Brake mechanisms 162, 164, 166, and 168 are configured by, for example, disk brakes, drum brakes, or the like and are respectively provided between the right front wheel 102 and the motor generator 112, between the left front wheel 104 and the motor generator 114, between the right rear wheel 106 and the motor generator 116, and between the left rear wheel 108 and the motor generator 118.

Image capturing apparatuses 170 each include an image capturing element such as a charge-coupled device (CCD) or a complementary metal-oxide semiconductor (CMOS). The image capturing apparatuses 170 capture images of an environment that is ahead of the electric vehicle 100 and generate image data of color images or monochrome images. Here, the color value of a color image is a group of numerical values including a brightness (Y) and two color differences (UV) or three hues (red (R), green (G), and blue (B)). Here, each color image or monochrome image captured by the image capturing apparatuses 170 is referred to as a brightness image and is distinguished from a distance image, which will be described later.

In addition, the two image capturing apparatuses 170 are disposed to be separated from each other in substantially the horizontal direction in such a manner that the optical axes of the image capturing apparatuses 170 are substantially parallel to each other in the heading direction of the electric vehicle 100. The image capturing apparatuses 170 continuously generate image data by capturing images of a detection region that is ahead of the electric vehicle 100, for example, per 1/60 second frame (60 fps).

An outside-vehicle environment recognition apparatus 172 acquires image data from each of the two image capturing apparatuses 170, calculates a parallax by using so-called pattern matching, and generates a distance image by associating the calculated parallax information (corresponding to a relative distance, which will be described later) with the image data. The process performed by the outside-vehicle environment recognition apparatus 172 will be described later in detail.

In the electric vehicle 100 having the above configuration, when a signal indicating that a shift lever, which is not illustrated, is set at a shift position is input to the central control apparatus 140, the central control apparatus 140 loads a traveling control process program stored in the ROM into the RAM and performs a traveling control process. While performing the traveling control process, the central control apparatus 140 serves as a motor controller 200, a braking controller 202, the steering controller 204, and the audio controller 206.

On the basis of a signal transmitted from the acceleration pedal sensor 150 and signals transmitted from the rotational speed sensors 142, 144, 146, and 148, the motor controller 200 calculates a target torque of each of the motor generators 112, 114, 116, and 118 by referring to a map stored in advance. Then, the motor controller 200 controls the motor generators 112, 114, 116, and 118 such that the torque of each of the motor generators 112, 114, 116, and 118 becomes the target torque through the inverters 122, 124, 126, and 128.

When a signal is transmitted from the brake pedal sensor 152, on the basis of the signal transmitted from the brake pedal sensor 152, the motor controller 200 causes the motor generators 112, 114, 116, and 118 to serve as power generators so that the battery 130 is charged with regenerative energy while braking the electric vehicle 100.

If a braking force of the motor generators 112, 114, 116, and 118 is insufficient, the braking controller 202 controls the brake mechanisms 162, 164, 166, and 168 to brake the electric vehicle 100.

The steering controller 204 controls the steering mechanism 158 in accordance with a signal transmitted from the acceleration pedal sensor 150, a signal transmitted from the brake pedal sensor 152, signals transmitted from the rotational speed sensors 142, 144, 146, and 148, and a signal transmitted from the steering angle sensor 154. Specifically, during autonomous driving (cruise control), the steering controller 204 controls the steering mechanism 158 so as to keep traveling in a lane of a road on the basis of a white line detected by a lane specifier 226 of the outside-vehicle environment recognition apparatus 172 (see FIG. 2), which will be described later.

The audio controller 206 causes the speaker 156 to output a vibration sound. The process performed by the audio controller 206 will be described later in detail.

Now, a configuration of the outside-vehicle environment recognition apparatus 172 will be described in detail. Here, a process for detecting a deviation of the host vehicle (the electric vehicle 100) from a travel lane will be described in detail, and configurations irrelevant to the characteristics of the example will be omitted from description.

Figure 2:
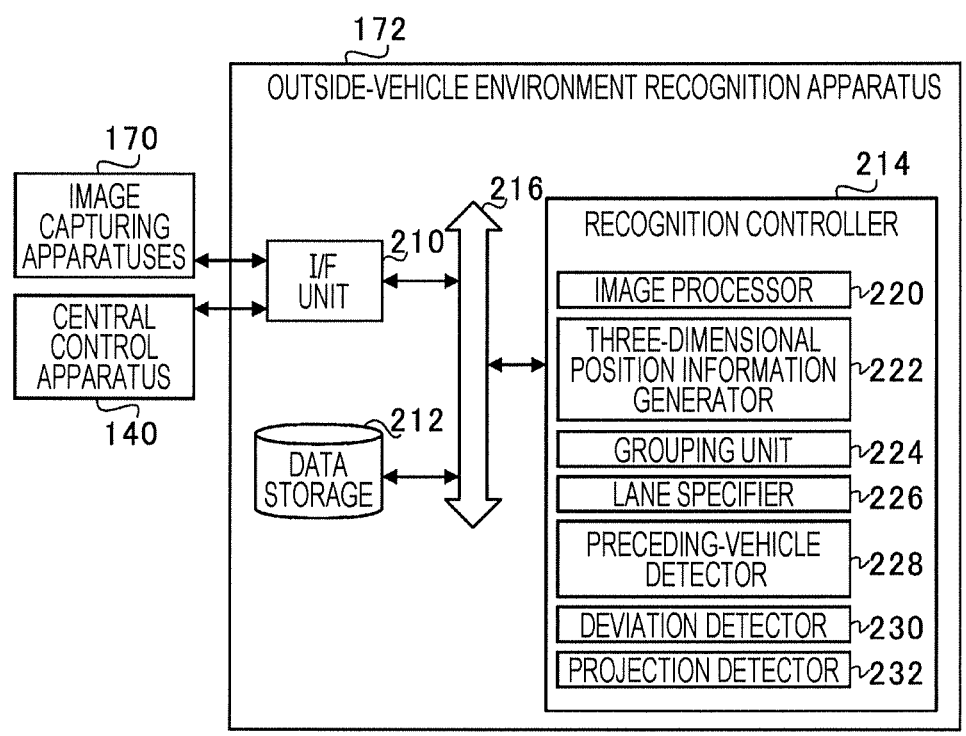
FIG. 2 is a functional block diagram illustrating general functions of an outside-vehicle environment recognition apparatus.

FIG. 2 is a functional block diagram illustrating general functions of the outside-vehicle environment recognition apparatus 172. As illustrated in FIG. 2, the outside-vehicle environment recognition apparatus 172 includes an interface (I/F) unit 210, a data storage 212, and a recognition controller 214.

The I/F unit 210 is an interface for mutually exchanging information with the image capturing apparatuses 170 and the central control apparatus 140. The data storage 212 is configured by a RAM, a flash memory, a hard disk drive (HDD), or the like, stores various kinds of information necessary for a process of each functional unit of the recognition controller 214 described below, and temporality stores image data received from the image capturing apparatuses 170.

The recognition controller 214 is configured by a semiconductor integrated circuit including a central processing unit (CPU), a ROM in which a program and the like are stored, a RAM as a work area, and the like, and controls the I/F unit 210, the data storage 212, and the like via a system bus 216. In addition, in the example, the recognition controller 214 also serves as an image processor 220, a three-dimensional position information generator 222, a grouping unit 224, the lane specifier 226, a preceding-vehicle detector 228, a deviation detector 230, and a projection detector 232. Processes performed by these functional units will be described below.

Image Processing

The image processor 220 acquires image data items from the two image capturing apparatuses 170, and calculates a parallax by using so-called pattern matching, in which a given block (e.g., 4 horizontal pixels×4 vertical pixels) is extracted from one of the image data items and a corresponding block is retrieved from the other of the image data items. Here, the term "horizontal" refers to the horizontal direction on a screen displaying a captured brightness image, and the term "vertical" refers to the vertical direction on a screen displaying a captured brightness image.

As the pattern matching, the brightness (Y color difference signal) of a block unit representing a given image position in one of two image data items may be compared with the brightness thereof in the other. For example, there are methods such as the sum of absolute difference (SAD) for calculating a difference in brightness, the sum of squared intensity difference (SSD) using the square of the difference, and normalized cross correlation (NCC) for calculating the similarity in variance obtained by subtracting an average from brightnesses of the respective pixels. The image processor 220 performs such a parallax calculating process per block unit for all blocks displayed in a detection region (e.g., 600 horizontal pixels×180 vertical pixels). Although each block herein is formed of 4 horizontal pixels×4 vertical pixels, any number of pixels can be set in the block.

However, although the image processor 220 can calculate the parallax for each block, which is a unit of a detection resolution, it is not possible for the image processor 220 to recognize a three-dimensional object in which the block is included as a part. Thus, the parallax information is not calculated per three-dimensional object unit, but is calculated independently per unit of a detection resolution (hereinafter referred to as a three-dimensional part) such as a block in a detection region. An image in which the parallax information (corresponding to a relative distance, which will be described later) calculated in the above manner is associated with each three-dimensional part of image data will be hereinafter referred to as a distance image.

Figure 3A:
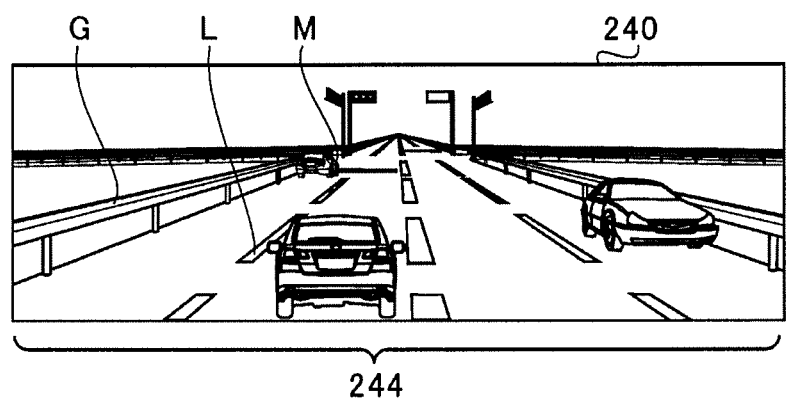
FIGS. 3A and 3B respectively illustrate a brightness image and a distance image.
Figure 3B:
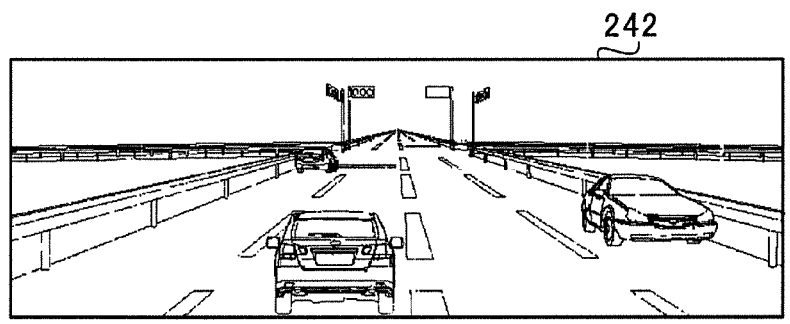

FIGS. 3A and 3B respectively illustrate a brightness image 240 and a distance image 242. For example, each of the two image capturing apparatuses 170 generates a brightness image of a detection region 244, and only one of the brightness images is illustrated as the brightness image 240 in FIG. 3A for ease of understanding. In the example, the image processor 220 calculates a parallax of each three-dimensional part from the brightness image 240 and generates the distance image 242 illustrated in FIG. 3B. The parallax of each three-dimensional part is associated with the corresponding three-dimensional part in the distance image 242. Here, each black dot represents the three-dimensional part for which a parallax has been calculated for the convenience of description.

Referring back to FIG. 2, on the basis of the distance image 242 generated by the image processor 220, the three-dimensional position information generator 222 converts the parallax information of each three-dimensional part in the detection region 244, into three-dimensional position information including a horizontal distance, a height, and a relative distance by a so-called stereo method. The stereo method here is a method for calculating, from the parallax of a three-dimensional part, the relative distance between the three-dimensional part and the image capturing apparatus 170, by using triangulation. On the basis of the relative distance to the three-dimensional part and the distance in the distance image 242 between the three-dimensional part and a point at the same relative distance as the three-dimensional part on the surface of the road, the three-dimensional position information generator 222 calculates the height of the three-dimensional part from the surface of the road.

The grouping unit 224 groups three-dimensional parts whose three-dimensional positions (the difference in a horizontal distance x, the difference in a height y, and the difference in a relative distance z) are within a predetermined area (e.g., 0.1 m) in the distance image 242, on the assumption that the three-dimensional parts correspond to an identical specific object. Thus, a three-dimensional object is generated as a set of the three-dimensional parts. The area for grouping is represented as the distance in the actual space and may be set to any value by a manufacturer. In addition, for a three-dimensional part newly added by the grouping, on the basis of the three-dimensional part, the grouping unit 224 further groups three-dimensional parts whose difference in the horizontal distance x, difference in the height y, and difference in the relative distance z are within a predetermined area. As a result, all of the three-dimensional parts that may be assumed to be an identical specific object are grouped as a three-dimensional object.

If a three-dimensional object satisfies predetermined conditions corresponding to a predetermined road (e.g., the positional relationship with a preceding vehicle M and a roadside three-dimensional object such as a guardrail G, illustrated in FIG. 3A, corresponds to a specific object "road"), the lane specifier 226 specifies the three-dimensional object as the specific object "road".

In addition, on the basis of the three-dimensional position in the distance image 242 or the brightness (color value) based on the brightness image 240, the lane specifier 226 specifies a white line (e.g., a preceding white line L illustrated in FIG. 3A) on the surface of the specified road. Targets to be specified here include a yellow line. In addition, the targets to be specified also include a broken white line and a broken yellow line. Hereinafter, the term "white line" also includes a yellow line and a broken (white or yellow) line.

The lane specifier 226 detects, as a white line, for example, an object that is grouped by the grouping unit 224 on the surface of the road, that has a color included in a preset brightness range of the white line, and that extends forward in the heading direction on the surface of the road. Although a case in which the lane specifier 226 detects a white line on the basis of image data from the image capturing apparatuses 170 has been described, the lane specifier 226 may detect a white line by another method, for example, by using laser.

On the basis of the specified road and white line, the lane specifier 226 specifies a travel lane in which the host vehicle travels. If a white line is not provided on the road, the lane specifier 226 may specify a travel lane on the basis of, for example, a roadside block, trench, or the like. The roadside block or trench is specified when a three-dimensional object satisfies predetermined conditions corresponding to a predetermined road, as in the case of the road.

If a center line is provided between the travel lane of the host vehicle and the opposite lane, the lane specifier 226 may specify the area of the travel lane (i.e., the boundary of the travel lane opposite to the opposite lane) on the basis of the distance from the center line.

If the grouped three-dimensional object satisfies predetermined conditions corresponding to a predetermined vehicle (e.g., if the three-dimensional object is located on the road and the size of the three-dimensional object corresponds to the size of a specific object "vehicle"), the preceding-vehicle detector 228 specifies the three-dimensional object as the specific object "vehicle". Among specific objects "vehicle", the preceding-vehicle detector 228 specifies, as a preceding vehicle, a vehicle heading in the same direction as the host vehicle on the basis of the positional relationship with the host vehicle and relative velocity.

The deviation detector 230 detects a deviation of the host vehicle from the travel lane. Specifically, the deviation detector 230 specifies the position of the host vehicle with respect to the travel lane specified by the lane specifier 226. Then, if the host vehicle is running on a white line, which is the boundary between the inside and outside of the travel lane, the deviation detector 230 detects a deviation of the host vehicle from the travel lane. Here, a case in which the host vehicle is running on the white line has been described. However, even if a white line is not provided, when the host vehicle is running on a road that is the boundary between the inside and outside of the travel lane, the deviation detector 230 detects a deviation of the host vehicle from the travel lane.

If the preceding vehicle specified by the preceding-vehicle detector 228 is traveling in the same lane, the deviation detector 230 may detect a deviation of the host vehicle from the travel lane on the basis of the position (course difference) of the host vehicle with respect to the preceding vehicle.

The projection detector 232 detects a plurality of projections provided on the boundary of the lane. The plurality of projections here are, for example, rumble strips and chatter bars (cat's eyes). If the grouped three-dimensional object satisfies predetermined conditions corresponding to predetermined rumble strips or chatter bars (e.g., if the three-dimensional object is located on a white line of the road and the size of the whole three-dimensional object corresponds to the size of a specific object "rumble strips"), the projection detector 232 specifies the three-dimensional object as the specific object "rumble strips".

The process for specifying the above-described specific object can be performed by employing a variety of existing techniques, and thus, a detailed description thereof will be omitted.

The outside-vehicle environment recognition apparatus 172 outputs the detection results (the position of the specific object with respect to the host vehicle, the deviation of the host vehicle from the travel lane (the position of the travel lane with respect to the host vehicle), the presence or absence of rumble strips or chatter bars (the position with respect to the host vehicle)) to the central control apparatus 140. In response to an operation instruction from a driver, on the basis of the detection results that are output from the outside-vehicle environment recognition apparatus 172, the central control apparatus 140 (the motor controller 200, the braking controller 202, and the steering controller 204) can perform autonomous driving (cruise control).

Thus, the central control apparatus 140 and the outside-vehicle environment recognition apparatus 172 serve as a vehicle control apparatus of the electric vehicle 100 in an example of the present invention. The central control apparatus 140 and the outside-vehicle environment recognition apparatus 172 have a function of informing a driver of the deviation of the host vehicle from the travel lane.

FIG. 4A illustrates exemplary torque of the motor generators 112, 114, 116, and 118, and FIG. 4B illustrates exemplary vehicle velocity. FIG. 4A illustrates exemplary changes in the torque of the motor generators 112, 114, 116, and 118 over time, and FIG. 4B illustrates exemplary changes in the vehicle velocity over time. Note that although a case in which the electric vehicle 100 is performing autonomous driving will be described below as an example, the following process may be performed in a case in which the electric vehicle 100 is not performing autonomous driving.

For example, when the deviation detector 230 detects a deviation of the host vehicle from the travel lane (hereinafter simply referred to as the deviation) at time Ta, the motor controller 200 increases and decreases the torque of the motor generators 112, 114, 116, and 118. That is, the motor controller 200 increases and decreases the torque by a predetermined amount whose central value is the above target torque that has been calculated. Here, for example, the torque of the motor generators 112, 114, 116, and 118 is increased and decreased five times between time Ta and time Tb and between time Tc and time Td.

In addition, if the host vehicle deviates from the travel lane to the right side, the motor controller 200 increases and decreases the torque of the motor generators 112 and 116 that transfer a driving force to the right front wheel 102 and the right rear wheel 106, and does not increase or decrease the torque of the motor generators 114 and 118 that transfer a driving force to the left front wheel 104 and the left rear wheel 108. In addition, if the host vehicle deviates from the travel lane to the left side, the motor controller 200 increases and decreases the torque of the motor generators 114 and 118 that transfer a driving force to the left front wheel 104 and the left rear wheel 108, and does not increase or decrease the torque of the motor generators 112 and 116 that transfer a driving force to the right front wheel 102 and the right rear wheel 106.

The case in which the motor generators 112, 114, 116, and 118 are provided for the respective wheels and are independently driven has been described above. However, if the motor generators are not provided for the respective wheels, the brake mechanisms 162, 164, 166, and 168 may independently make a braking force act so as to vibrate the wheels on the side to which the host vehicle deviates from the travel lane.

Thus, as illustrated in FIG. 4B, the vehicle velocity of the host vehicle is increased and decreased between time Ta and time Tb and between time Tc and time Td. As a result, a vibration is generated in the host vehicle as if the host vehicle is running on rumble strips. Thus, it is possible to inform a driver that the host vehicle deviates from the travel lane, in a manner that is easy for the driver to intuitively understand the deviation.

The cycle for increasing and decreasing the torque here is freely set in accordance with the vehicle velocity so as to generate a vibration at an intended frequency. In this case, since the motor generators 112, 114, 116, and 118 generate a vibration, the frequency and amplitude of the vibration to be generated may be designed with a high degree of freedom. In addition, since the whole vehicle body vibrates, it is possible to reproduce a vibration as if the vehicle is running on rumble strips or the like.

It may also be possible to generate a vibration by using the brake mechanisms 162, 164, 166, and 168 instead of the motor generators 112, 114, 116, and 118. However, if a vibration is generated by using the motor generators 112, 114, 116, and 118, electric power that has been consumed in order to increase the torque is collected as a regenerative energy at the time the torque decreases. Accordingly, it is possible to inform a driver that the host vehicle deviates from the travel lane with the energy consumption reduced.

In addition, as described above, if the host vehicle deviates from the travel lane to the right side, the motor controller 200 increases and decreases the torque of the motor generators 112 and 116 that transfer a driving force to the right front wheel 102 and the right rear wheel 106, whereas if the host vehicle deviates from the travel lane to the left side, the motor controller 200 increases and decreases the torque of the motor generators 114 and 118 that transfer a driving force to the left front wheel 104 and the left rear wheel 108. Accordingly, the wheels on the side to which the host vehicle deviates from the travel lane vibrate as in a case in which the host vehicle actually runs on rumble strips, and thus, it is easy for the driver to intuitively understand whether it is the right side or the left side to which the host vehicle deviates from the travel lane.

In addition, as illustrated in FIG. 4A, the motor controller 200 sets, as the target torque, a value obtained by performing a first-order lag filtering process on torque having a rectangular variable waveform. Accordingly, the velocity change becomes similar to the velocity change when the host vehicle is running on rumble strips or the like, and it is possible to generate a vibration similar to a vibration generated when the host vehicle is running on rumble strips or the like.

In addition, at time Ta, when the vibration for the first time and some more times (two times in this case) is to be generated, the motor controller 200 multiplies, by a gain of less than 1, the amount for increasing and decreasing the torque, thereby reducing the amount. For example, the gain becomes closer to 1 as the number of times increases (the gain becomes closer to 1 in the second time than in the first time). Thus, as illustrated in FIG. 4A, the vibration for the first time and some more times (two times) is relatively small and is gradually increased, and thus, it is possible to reproduce a vibration that is similar to a vibration generated when the host vehicle is actually running on rumble strips or the like.

In addition, while the torque of the motor generators 112, 114, 116, and 118 is increased and decreased, the audio controller 206 causes the speaker 156 to output a vibration sound. Here, the vibration sound that is output from the speaker 156 is a pseudo-reproduction of a vibration sound that is produced in the compartment when the host vehicle is running on rumble strips or the like, in synchronization with the increase and decrease in the torque of the motor generators 112, 114, 116, and 118.

The vibration sound is generated in addition to the increase and decrease in the torque, and thus, it is possible to inform the driver that the host vehicle deviates from the travel lane in a manner that it is easier for the driver to intuitively understand the deviation.

If the deviation detector 230 still detects the deviation at time Te, the motor controller 200 increases and decreases the torque of the motor generators 112, 114, 116, and 118 by a larger amount than before. Accordingly, as illustrated in FIG. 4B, immediately after time Te, the vehicle velocity of the host vehicle is increased and decreased by a larger amount than before. Thus, in a case in which the deviation of the host vehicle from the travel lane lasts for a predetermined period or longer, the motor controller 200 increases and decreases the torque of the motor generators 112, 114, 116, and 118 by a larger amount than that in a case in which the deviation lasts for a period shorter than the predetermined period.

In addition, at time Tf, the motor controller 200 increases and decreases the torque of the motor generators 112, 114, 116, and 118 for a longer period than before. Accordingly, as illustrated in FIG. 4B, immediately after time Tf, the vehicle velocity of the host vehicle is increased and decreased for a longer period than before (long-period vibration is generated).

Thus, the amount for increasing and decreasing the torque of the motor generators 112, 114, 116, and 118 is changed, or the period for increasing and decreasing the torque is changed, and thereby the amplitude and periodicity of a vibration to be generated are changed, and the effect of informing the driver can be increased. In a case in which the period for increasing and decreasing the torque is changed, the load to the motor generators 112, 114, 116, and 118, the inverters 122, 124, 126, and 128, and the battery 130 is lighter than that in a case in which the amount for increasing and decreasing the torque is changed, thereby suppressing an increase in the temperature of power-electronics.

If the host vehicle deviates from the travel lane toward the opposite lane, the motor controller 200 increases and decreases the torque so as to generate a vibration that imitates the running on chatter bars. If the host vehicle deviates from the travel lane to the side opposite to the opposite lane, the motor controller 200 increases and decreases the torque so as to generate a vibration that imitates the running on rumble strips. The vibration that imitates the running on chatter bars has a larger amplitude than the vibration that imitates the running on rumble strips.

That is, in a case in which the host vehicle deviates from the travel lane toward the opposite lane, the motor controller 200 increases and decreases the torque of the motor generators 112, 114, 116, and 118 by a larger amount than that in a case in which the host vehicle deviates from the travel lane to the side opposite to the opposite lane. If the host vehicle travels in the opposite lane, the host vehicle might possibly collide with an oncoming vehicle. This is why the deviation toward the opposite lane is to be more reliably avoided than the deviation to the side opposite to the opposite lane. With the above control, a larger vibration is generated in the case of the deviation toward the opposite lane than in the case of the deviation to the side opposite to the opposite lane so as to inform the driver.

In addition, upon the projection detector 232 detecting rumble strips or chatter bars, the motor controller 200 determines whether the host vehicle is running on the detected rumble strips or chatter bars on the basis of the positional relationship between the host vehicle and the rumble strips or chatter bars. As a result, if it is determined that the host vehicle is running on the rumble strips or chatter bars, even if the deviation detector 230 has detected a deviation, the motor controller 200 does not increase or decrease the torque of the motor generators 112, 114, 116, and 118. Thus, it is possible to prevent a vibration from being generated from an increase and a decrease in the torque even when the host vehicle is actually running on rumble strips or chatter bars; otherwise the informing effect would be weakened due to double vibration.

Figure 5:
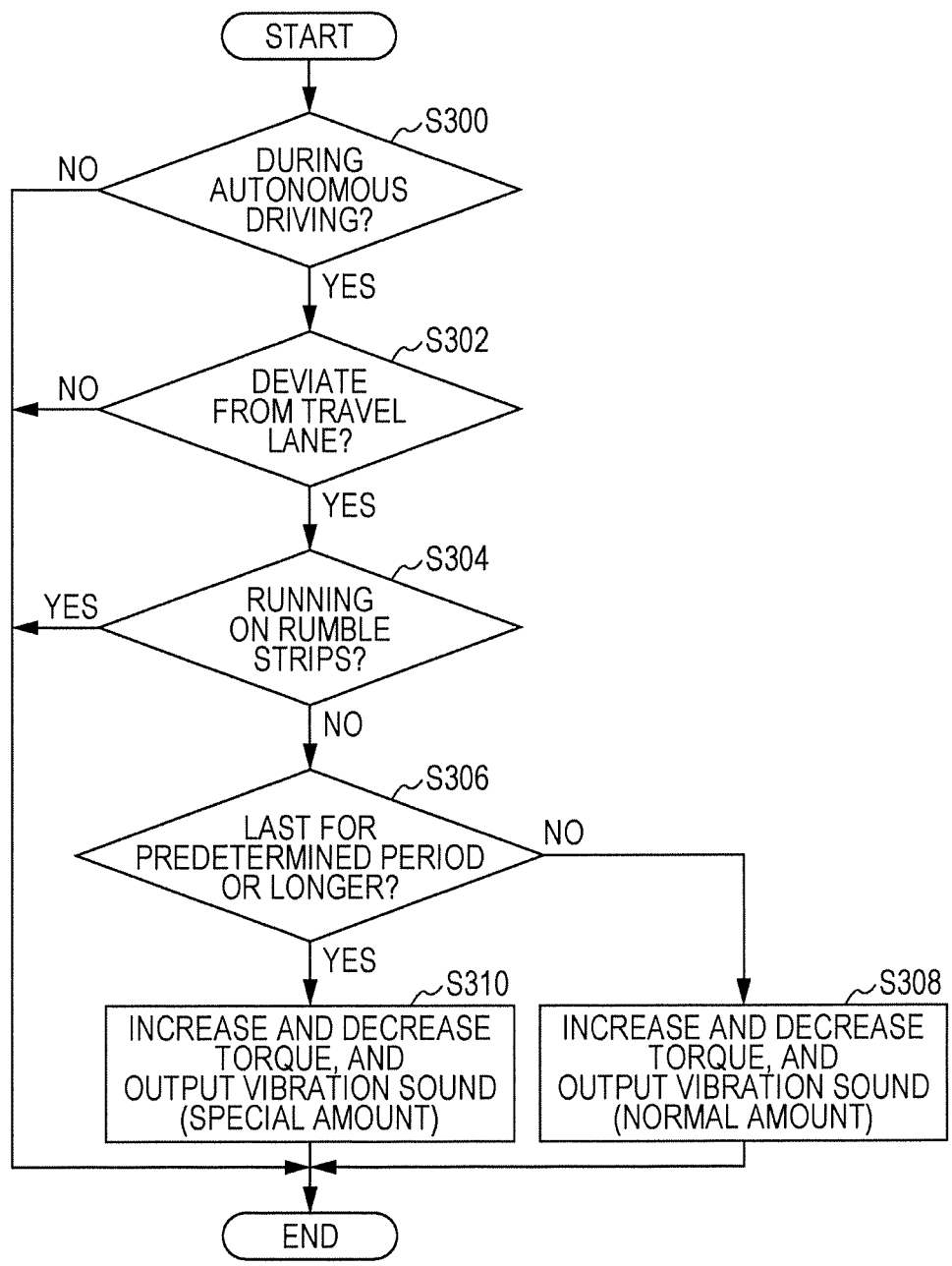
FIG. 5 is a flowchart illustrating a torque control process.

FIG. 5 is a flowchart illustrating the flow of a torque control process. The process illustrated in FIG. 5 is repeatedly performed in a predetermined cycle.

(S300)

The motor controller 200 determines whether the electric vehicle 100 is performing autonomous driving. If the electric vehicle 100 is performing autonomous driving, the process proceeds to step S302. If the electric vehicle 100 is not performing autonomous driving, the torque control process ends.
(S302)

The motor controller 200 determines whether the deviation detector 230 has detected a deviation of the host vehicle from the travel lane. If the deviation detector 230 has detected a deviation of the host vehicle from the travel lane, the process proceeds to step S304. If the deviation detector 230 has not detected a deviation of the host vehicle from the travel lane, the torque control process ends.
(S304)

The motor controller 200 determines whether the host vehicle is running on rumble strips or chatter bars. If the host vehicle is not running on rumble strips or chatter bars, the process proceeds to step S306. If the host vehicle is running on rumble strips or chatter bars, the torque control process ends.
(S306)

The motor controller 200 determines whether the deviation of the host vehicle from the travel lane lasts for a predetermined period or longer. If the deviation of the host vehicle from the travel lane does not last for a predetermined period or longer (shorter than the predetermined period), the process proceeds to step S308. If the deviation of the host vehicle from the travel lane lasts for a predetermined period or longer, the process proceeds to step S310.
(S308)

The motor controller 200 increases and decreases the torque of the motor generators 112, 114, 116, and 118. At this time, the motor controller 200 increases and decreases the torque so as to generate a vibration that imitates the running on chatter bars when the host vehicle deviates from the travel lane toward the opposite lane. The motor controller 200 increases and decreases the torque so as to generate a vibration that imitates the running on rumble strips when the host vehicle deviates from the travel lane to the side opposite to the opposite lane. The motor controller 200 increases and decreases the torque of the motor generators 112 and 116 or the motor generators 114 and 118 that are on the side to which the host vehicle deviates from the travel lane. While the torque of the motor generators 112, 114, 116, and 118 is increased and decreased, the audio controller 206 causes the speaker 156 to output a vibration sound.
(S310)

As in step S308, the motor controller 200 increases and decreases the torque of the motor generators 112, 114, 116, and 118. At this time, the motor controller 200 increases and decreases the torque of the motor generators 112, 114, 116, and 118 by a larger amount than that in step S308 or increases and decreases the torque for a longer period than that in step S308. While the torque of the motor generators 112, 114, 116, and 118 is increased and decreased, the audio controller 206 causes the speaker 156 to output a vibration sound.

Although the example of the present invention has been described above with reference to the attached drawings, it is needless to say that the present invention is not limited to the example. It is apparent that a person skilled in the art may easily arrive at various changes or modifications without departing from the scope of the claims. It should be understood that those changes and modifications are within the technical scope of the present invention.

For example, although the above example has described the electric vehicle 100 that is driven only by using the motor generators 112, 114, 116, and 118, the present invention is also applicable to a hybrid automobile that is driven by using a motor and an engine.

In addition, the above example has described a case in which, if the host vehicle deviates from the travel lane toward the opposite lane, the motor controller 200 increases and decreases the torque of the motor generators 112, 114, 116, and 118 by a larger amount than that if the host vehicle deviates from the travel lane to the side opposite to the opposite lane. However, if the host vehicle deviates from the travel lane toward the opposite lane, the motor controller 200 may increase and decrease the torque of the motor generators 112, 114, 116, and 118 by a smaller amount than that if the host vehicle deviates from the travel lane to the side opposite to the opposite lane, or may increase and decrease the torque of the motor generators 112, 114, 116, and 118 by the same amount as that if the host vehicle deviates from the travel lane to the side opposite to the opposite lane.

In addition, the above example has described a case in which, if the host vehicle deviates from the travel lane to the right side, the motor controller 200 increases and decreases the torque of the motor generators 112 and 116 that transfer a driving force to the right front wheel 102 and the right rear wheel 106, and if the host vehicle deviates from the travel lane to the left side, the motor controller 200 increases and decreases the torque of the motor generators 114 and 118 that transfer a driving force to the left front wheel 104 and the left rear wheel 108. However, regardless of whether the host vehicle deviates from the travel lane to the right side or the left side, the motor controller 200 may increase and decrease the torque of all the motor generators 112, 114, 116, and 118 or may increase and decrease the torque of the two motor generators 112 and 114 on the front wheels side or the torque of the two motor generators 116 and 118 on the rear wheels side.

In addition, although the above example has described a case in which the speaker 156 is included, the speaker 156 is not a necessary component. As long as a vibration sound can be output, an audio output unit may be configured by an apparatus other than the speaker 156.

In addition, the above example has described a case in which, if the deviation of the host vehicle from the travel lane lasts for a predetermined period or longer, the motor controller 200 increases and decreases the torque of the motor generators 112, 114, 116, and 118 by a larger amount than that if the deviation lasts for a period shorter than the predetermined period. However, regardless of the period for which the deviation of the host vehicle from the travel lane lasts, the motor controller 200 may increase and decrease the torque of the motor generators 112, 114, 116, and 118 by the same amount.

In addition, the above example has described a case in which, if it is determined that the host vehicle is running on rumble strips or chatter bars, even if the deviation detector 230 detects a deviation, the motor controller 200 does not increase or decrease the torque of the motor generators 112, 114, 116, and 118. However, even if it is determined that the host vehicle is running on rumble strips or chatter bars, if the deviation detector 230 detects a deviation, the motor controller 200 may increase and decrease the torque of the motor generators 112, 114, 116, and 118.

According to an example of the present invention, it is possible to inform a driver that a host vehicle deviates from a travel lane with the energy consumption reduced.

The central control apparatus 140 and the outside-vehicle environment recognition apparatus 172 illustrated in FIGS. 1 and 2 can be implemented by circuitry including at least one semiconductor integrated circuit such as at least one processor (e.g., a central processing unit (CPU)), at least one application specific integrated circuit (ASIC), and/or at least one field programmable gate array (FPGA). At least one processor can be configured, by reading instructions from at least one machine readable tangible medium, to perform all or a part of functions of the central control apparatus 140 including the motor controller 200, the braking controller 202, the steering controller 204, and the audio controller 206; and the outside-vehicle environment recognition apparatus 172 including the image processor 220, the three-dimensional position information generator 222, the grouping unit 224, the lane specifier 226, the preceding-vehicle detector 228, the deviation detector 230, and the projection detector 232. Such a medium may take any forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the non-volatile memory may include a ROM and a NVRAM. The ASIC is an integrated circuit (IC) customized to perform, and the FPGA is an integrated circuit designed to be configured after manufacturing in order to perform, all or a part of the functions of the modules illustrated in FIGS. 1 and 2.

The invention claimed is:

1. A vehicle control apparatus for a host vehicle including a first wheel on a first side of the host vehicle and a second wheel on a second side of the host vehicle, the first side being opposite the second side of the host vehicle, the vehicle control apparatus comprising:
 at least one processor;
 at least one memory storing instructions, which when executed by the at least one processor, cause the at least one processor to perform operations comprising:
  controlling 1) a first driving motor of the host vehicle to transfer a first driving force to the first wheel on the first side of the host vehicle and 2) a second driving motor of the host vehicle transfer a second driving force to the second wheel on the second side of the host vehicle;
  detecting a deviation of a host vehicle from a travel lane in which the host vehicle travels based on images captured by image capturing apparatuses; and
  when the first side of the host vehicle deviates from the travel lane based on the detected deviation of the host vehicle, controlling the first driving motor to 1) generate first torque so that increasing of the first torque by a first amount and decreasing of the first torque by the first amount are repeated a first number of times within a first period of time and 2) transfer the first driving force to the first wheel on the first side of the host vehicle according to the generated first torque; and
  when the second side of the host vehicle being opposite the first side of the host vehicle deviates from the travel lane toward an oncoming traffic lane, controlling the second driving motor to 1) generate second torque so that increasing of the second torque by a second amount being larger than the first amount and decreasing of the second torque by the second amount are repeated a second number of times within a second period of time.

2. The vehicle control apparatus according to claim 1, the operations further comprising:
 controlling a speaker to generate a vibration sound and output the vibration sound upon the deviation being detected.

3. The vehicle control apparatus according to claim 1, wherein when the first side of the host vehicle deviates from the travel lane for the first period of time or longer, the first driving motor changes an amount of increasing the first torque and decreasing the first torque from the first amount to the second amount.

4. The vehicle control apparatus according to claim 1, wherein the operations further comprises:
 determining that the host vehicle drives on a plurality of projections provided on a boundary of the traveling lane at the time of deviation based on the images captured by the image capturing apparatuses; and
 when the host vehicle is determined to drive on the plurality of projections, controlling the first driving motor so that the first torque is not increased or decreased by the first amount even when the deviation is detected.

5. A vehicle control apparatus for a host vehicle including a first wheel on a first side of the host vehicle and a second wheel on a second side of the host vehicle, the first side being opposite the second side of the host vehicle, the vehicle control apparatus comprising:
 circuitry configured to:
  control 1) a first driving motor of the host vehicle to transfer a first driving force to the first wheel on the first side of the host vehicle and 2) a second driving motor of the host vehicle transfer a second driving force to the second wheel on the second side of the host vehicle;
  detect a deviation of a host vehicle from a travel lane in which the host vehicle travels; and
  when the first side of the host vehicle deviates from the travel lane based on the detected deviation of the host vehicle, control the first driving motor to 1) generate first torque so that increasing of the first torque by a first amount and decreasing of the first torque by the first amount are repeated a first number of times within a first period of time and 2) transfer the first driving force to the first wheel on the first side of the host vehicle according to the generated first torque in the first oscillation pattern while controlling second torque of the second driving motor not in the first oscillation pattern; and
  when the second side of the host vehicle being opposite the first side of the host vehicle deviates from the travel lane toward an oncoming traffic lane, controlling the second driving motor to 1) generate second torque so that increasing of the second torque by a second amount being larger than the first amount and decreasing of the second torque by the second amount are repeated a second number of times within a second period of time.

* * * * *